United States Patent
Haase et al.

(10) Patent No.: US 12,099,174 B2
(45) Date of Patent: Sep. 24, 2024

(54) METHOD AND MICROSCOPE FOR GENERATING AN OVERVIEW IMAGE OF A SAMPLE

(71) Applicant: Carl Zeiss Microscopy GmbH, Jena (DE)

(72) Inventors: Daniel Haase, Zoellnitz (DE); Manuel Amthor, Jena (DE); Markus Sticker, Jena (DE); Sebastian Backs, Munich (DE); Thomas Ohrt, Golmsdorf (DE); Christian Dietrich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/498,339

(22) Filed: Oct. 11, 2021

(65) Prior Publication Data
US 2022/0113525 A1    Apr. 14, 2022

(30) Foreign Application Priority Data

Oct. 12, 2020   (DE) .......................... 102020126737.1

(51) Int. Cl.
*G02B 21/06*      (2006.01)
*G02B 21/00*      (2006.01)
(Continued)

(52) U.S. Cl.
CPC ......... *G02B 21/0052* (2013.01); *G02B 21/06* (2013.01); *G02B 21/367* (2013.01); *G06N 20/00* (2019.01)

(58) Field of Classification Search
CPC .............. G02B 21/0052; G02B 21/367; G06N 20/00
(Continued)

(56) References Cited

U.S. PATENT DOCUMENTS 9,835,839 B2   12/2017  Hein
2002/0027203 A1  3/2002  Engelhardt et al.
(Continued)

FOREIGN PATENT DOCUMENTS

CN    110692006 A    1/2020
DE    60005138 T2    6/2004
(Continued)

OTHER PUBLICATIONS

German Search Report (with English translation) from German Priority Patent Appl. No. DE102020126737.1 dated May 23, 2021.
(Continued)

*Primary Examiner* — Jayanti K Patel
*Assistant Examiner* — Richard B Carter
(74) *Attorney, Agent, or Firm* — KUSNER & JAFFE

(57) ABSTRACT

A method for generating an overview image of a sample which is arranged in an observation volume of a microscope by means of a sample carrier is proposed, wherein the sample carrier is illuminated by a first illumination, wherein a preliminary overview image is generated using the first illumination and an overview camera of the microscope, wherein an overview image illumination is chosen on the basis of the preliminary overview image, wherein the sample carrier is illuminated by the overview illumination, and wherein the overview image is generated using the overview image illumination and the overview camera.

17 Claims, 14 Drawing Sheets

(51) Int. Cl.
G02B 21/36 (2006.01)
G06N 20/00 (2019.01)
(58) Field of Classification Search
USPC .......................................... 348/79; 382/103
See application file for complete search history.

(56) References Cited

U.S. PATENT DOCUMENTS

| | | | |
|---|---|---|---|
| 2009/0074393 | A1 | 3/2009 | Park et al. |
| 2013/0121530 | A1* | 5/2013 | Hing ................ G01N 21/6486 382/103 |
| 2013/0155499 | A1 | 6/2013 | Dixon |
| 2014/0313312 | A1 | 10/2014 | Gaiduk et al. |
| 2014/0354796 | A1 | 12/2014 | Hein |
| 2016/0202460 | A1 | 7/2016 | Zheng |
| 2016/0216208 | A1 | 7/2016 | Kim et al. |
| 2017/0010455 | A1 | 1/2017 | Tsujimoto |
| 2017/0205617 | A1 | 7/2017 | Stoppe et al. |
| 2017/0208234 | A1* | 7/2017 | Wang ....................... G06T 7/49 |
| 2017/0301101 | A1 | 10/2017 | Stoppe et al. |
| 2017/0307530 | A1 | 10/2017 | Mikami |
| 2017/0351081 | A1 | 12/2017 | Dowaki et al. |
| 2018/0024346 | A1 | 1/2018 | Inomata et al. |
| 2018/0089840 | A1 | 3/2018 | Yan et al. |
| 2018/0130233 | A1* | 5/2018 | Deck .................... G02B 21/365 |
| 2018/0191948 | A1 | 7/2018 | Zheng |
| 2019/0072751 | A1* | 3/2019 | Rainbolt .................. G06T 7/90 |
| 2019/0353885 | A1 | 11/2019 | Siebenmorgen |
| 2019/0353886 | A1 | 11/2019 | Iliopoulos et al. |
| 2020/0050891 | A1 | 2/2020 | Krueger et al. |
| 2020/0057291 | A1 | 2/2020 | Haase et al. |
| 2020/0088984 | A1 | 3/2020 | Haase et al. |
| 2020/0200531 | A1 | 6/2020 | Amthor et al. |
| 2020/0341253 | A1* | 10/2020 | Foelling ............. G01N 21/6458 |
| 2020/0363345 | A1* | 11/2020 | Eckhardt ................ G01N 15/02 |
| 2020/0371333 | A1 | 11/2020 | Amthor et al. |
| 2020/0371335 | A1 | 11/2020 | Amthor et al. |
| 2021/0064845 | A1 | 3/2021 | Stumpe et al. |
| 2021/0278651 | A1* | 9/2021 | Knebel ................. G02B 21/04 |
| 2022/0058782 | A1 | 2/2022 | Amthor et al. |
| 2022/0091405 | A1 | 3/2022 | Amthor et al. |
| 2022/0114732 | A1 | 4/2022 | Amthor et al. |

FOREIGN PATENT DOCUMENTS

| | | |
|---|---|---|
| DE | 102011114336 A1 | 3/2013 |
| DE | 102014102080 A1 | 8/2015 |
| DE | 102014113433 A1 | 3/2016 |
| DE | 102015122712 A1 | 6/2017 |
| DE | 102017100262 A1 | 7/2018 |
| DE | 102017109698 A1 | 11/2018 |
| DE | 102017111718 A1 | 12/2018 |
| DE | 102018219867 A1 | 5/2020 |
| DE | 102018133188 A1 | 6/2020 |
| DE | 102019114117 B3 | 8/2020 |
| DE | 102019113540 A1 | 11/2020 |
| DE | 102019114012 A1 | 11/2020 |
| EP | 2793069 A1 | 10/2014 |
| EP | 3608701 A1 | 2/2020 |
| JP | H04330411 A | 11/1992 |
| JP | 2011004638 A | 1/2011 |
| JP | 2015194544 A | 11/2015 |
| WO | WO2015179452 A1 | 11/2015 |
| WO | WO2016012391 A1 | 1/2016 |
| WO | WO2016063322 A1 | 4/2016 |
| WO | WO2016090331 A1 | 6/2016 |
| WO | WO2019160580 A1 | 8/2019 |

OTHER PUBLICATIONS

"Lymphe," Wikipedia, last edited on Sep. 28, 2020, originally accessed on May 5, 2021, currently accessed Apr. 28, 2022, https://de.wikipedia.org/w/index.php?title=Lymphe&oldid=204061667, 10 pages, (English translation provided).

Krizhevsky, Sutskever, Hinton: "ImageNet Classification with Deep Convolutional Neural Networks" (NIPS 2012).

He, Zhang, Ren, Sun: "Deep residual learning for image recognition" (CVPR 2016).

Office Action (with English translation) dated Feb. 18, 2024 in related/corresponding Chinese Patent Application No. 202111177352.0.

* cited by examiner

13000

14000

15012
12010
15011

METHOD AND MICROSCOPE FOR GENERATING AN OVERVIEW IMAGE OF A SAMPLE

FIELD OF THE INVENTION

The present invention relates to a method for generating an overview image of a sample which is arranged in an observation volume of a microscope by means of a sample carrier. Further, the invention relates to a microscope that is set up to carry out the method.

BACKGROUND OF THE INVENTION

On account of small object fields and low depths of field of objectives at high magnifications, the user of a microscope finds it difficult to arrange a sample in the observation volume such that a feature of the sample to be examined is located in the object field of the objective with a high magnification.

DE 10 2017 111 718 A1 therefore proposes a method for generating and analysing an overview contrast image of a sample carrier and/or of samples arranged on the sample carrier. In the process, a sample carrier, which is arranged at least partially in the focus of a detection optical unit, is illuminated in transmitted light with a two-dimensional, array-type illumination pattern. At least two raw overview images are detected with different illuminations of the sample carrier, and a calculation algorithm that is used to calculate an overview contrast image from the at least two raw overview images is selected on the basis of information that is to be extracted from the overview contrast image. Finally, an image evaluation algorithm that is used to extract the information is chosen on the basis of information that is to be extracted from the overview contrast image. The overview contrast image can be provided to the user for navigation purposes.

Different types of sample carriers are used to examine samples by means of a microscope. By way of example, the employed sample carriers include so-called multiwell plates, chamber slides, petri dishes, slides with cover slips, etc.

SUMMARY OF THE INVENTION

It is an object of the present invention to develop the known method to the effect of being able to very reliably generate an overview image of a sample independently of the sample carrier, the overview image allowing the user of the microscope to navigate to the desired location of the sample, i.e., to position the sample location to be examined in the field of view and the focal plane of the objective with a high magnification.

This object is achieved by the features of the main claim and the alternative independent claims. Advantageous configurations are specified in the dependent claims.

A method for generating an overview image of a sample which is arranged in an observation volume of a microscope by means of a sample carrier is proposed, wherein the sample carrier is illuminated by a first illumination, wherein a preliminary overview image is generated using the first illumination and an overview camera of the microscope, wherein an overview image illumination is chosen on the basis of the preliminary overview image, wherein the sample carrier is illuminated by the overview illumination, wherein a decision is made on the basis of the preliminary overview image as to how many recordings with the overview camera are necessary to record the entire sample carrier region, and wherein the overview image is generated using the overview illumination and the overview camera.

The first illumination can be a reflected light illumination or a transmitted light illumination. It is also possible to provide a combination of a reflected light illumination and a transmitted light illumination for the first illumination.

In this case, the overview camera can record a larger object field than could be recorded by a microscope objective. The generation of an overview image using the overview camera may require less time than the generation of the overview image using a microscope objective with a low magnification, in the case of which a plurality of individual images may optionally have to be combined using stitching techniques in order to be able to image the entire sample. Likewise, the overview camera can have a lens with a greater depth of field than that of the microscope objective. The overview camera can be arranged to the side of the microscope objectives and be arranged in a manner viewing obliquely on the sample carrier. It is likewise conceivable to provide a mirror at a position of the objective turret of a microscope, said mirror deflecting light coming from the sample carrier laterally in the direction of the overview camera. It is further conceivable that the overview camera has a non-telecentric lens.

The overview image illumination can be a reflected light illumination and/or a transmitted light illumination. It was found that many sample carriers can be represented with greater contrast when a transmitted light illumination is used, as a result of which the quality of an overview image of low-contrast samples is improved. By way of example, a transmitted light dark field contrast can be used in the process. In the case of some sample carriers, for example multiwell plates, structures of the sample carrier can lead to light of the transmitted light illumination being blocked or deflected such that raw overview images of the overview image camera cannot always be evaluated with the desired reliability. This can make the creation of an overview image of the sample carrier and the sample more difficult. If such sample carriers are illuminated with reflected light illumination then the overview images can typically be created with great reliability since the features of the sample carrier can be recognized better and a certain position can be subsequently honed in on by a microscope with greater reliability. By virtue of initially generating a preliminary overview image using a first illumination and choosing the overview image illumination on the basis of the preliminary overview image it is possible to create an overview image for different sample carriers with greater reliability. For the overview image, it is subsequently also possible to use a combination of a reflected light illumination, which can facilitate a better recognizability of the sample carrier, and a transmitted light illumination, with which samples arranged on the sample carrier (e.g., cells arranged in wells of a multiwell plate) can be represented with greater contrast.

The preliminary overview image can be processed in a trained machine learning-based system (ML system), wherein the overview image illumination for further overview recordings is chosen on the basis of an output of the ML system. By way of example, the ML system may have been trained using a set of training images, a specification being provided for each training image as to whether the overview image can be created with greater reliability using a reflected light illumination or using a transmitted light illumination. It is likewise conceivable for the ML system to be used to determine which contrast is better suited to the creation of the overview image. By way of example, a bright field contrast or a dark field contrast can be used for the creation of the overview image. It is also conceivable that a bright field contrast is combined with a dark field contrast for the purposes of creating the overview image.

In one configuration of the method, the output of the trained ML system can comprise a statement about the sample carrier type of the sample carrier and the overview illumination can be determined on the basis of the sample carrier type. By way of example, it is conceivable that the ML system has been trained to determine on the basis of the preliminary overview image whether the sample carrier is a multiwell plate or a slide with a coverslip. In this case, a different overview image illumination can be chosen depending on the sample carrier type. By way of example, a reflected light illumination may be chosen for multiwell plates.

In a further configuration, a calibration plate is initially arranged in the observation volume of the microscope system. The calibration plate is illuminated by the calibration illumination, wherein a calibration overview image is generated using the calibration illumination and the overview camera. In turn, the calibration illumination can be a reflected light illumination or a transmitted light illumination. Calibration data can be obtained on the basis of the calibration overview image. The preliminary overview image and/or the overview image is subsequently generated with the aid of the calibration data. In particular, a calibration plate can be understood to mean a plate which has predefined calibration structures. By way of example, the calibration plate may have been provided with a predefined pattern of reference points. The calibration plate can be constituted in such a way that it can be inserted into a stage system of the microscope in a defined manner. In particular, the calibration plate can be configured so that it can be repeatedly inserted with an identical relative position and/or orientation into the stage system of the microscope. The predetermined calibration structures can allow a correction of optical distortions to be undertaken, said distortions being caused by a lens of the overview camera. Likewise, perspective corrections may be facilitated, by means of which the non-orthogonal alignment of the overview camera in relation to the stage system of the microscope, and hence also to the sample carrier, can be compensated for. Furthermore, it is conceivable for the calibration overview image to be used to describe a relationship between the pixel scaling of the raw images recorded by the overview camera and the distance to sample structures on a sample arranged on a sample carrier situated in the observation volume of the microscope. Furthermore, the calibration plate can be arranged at different positions in the observation volume and calibration overview images can be generated for the respective positions. This can facilitate a further improvement in the aforementioned corrections and relationships. By way of example, the calibration plate inserted into the stage system of the microscope can be moved laterally (i.e., in the x-direction and in the y-direction) and actively (i.e., in the z-direction) with the aid of translation units.

The calibration plate can comprise a first calibration structure in particular. The calibration overview image can comprise an image representation of the first calibration structure. A first detailed image of the first calibration structure can be generated using a microscope objective of the microscope. Calibration data for locating a sample detail image of the sample in the overview image can be obtained on the basis of the calibration overview image and the first detailed image.

Further, the calibration plate can have a second calibration structure. After the first detailed image has been generated, the position of the calibration plate in relation to the microscope objective can be altered by a predefined translation vector and a second detailed image of the second calibration structure can be generated using the microscope objective of the microscope. The calibration data can subsequently be obtained by additional use being made of the predefined translation vector and the second detailed image.

By changing the position of the calibration structure in relation to the microscope, it is possible to bring the first calibration structure into the object field of the microscope objective at one point and then the second calibration structure. Consequently, it is possible to establish a relationship between positions on the subsequently generated overview image and the sample detail images obtained with the microscope objectives. In particular, it is possible to hone in on more than the first calibration structure and the second calibration structure in order to determine the relationship. By way of example, it is possible to take account of more than four calibration structures, which may also be referred to as reference points. In view of the time required for generating the calibration data and the quality of the calibration data, the use of exactly four calibration structures may represent an optimum. In particular, the use of four calibration structures may be sufficient to determine the homography.

The sample detail image can subsequently be generated using the microscope objective used to record the calibration structures. However, it is likewise conceivable to use a different microscope objective arranged on the same optical axis. By way of example, the microscope objectives can be reproducibly arranged on the same optical axis in the case of objective turrets of a microscope. It is therefore conceivable to dispense with recording the calibration structures for each individual microscope objective. However, recording detailed images of the calibration structures may also be provided for each microscope objective for the purposes of locating the sample detail image even better in the overview image.

The calibration data can be determined with the aid of the calibration plate at regular intervals in order to facilitate the reliable creation of the overview image. In particular, the calibration data can be determined after a transport or retrofit of the microscope. After the calibration data or the calibration data record have been determined, they can be used for the creation of overview images of a plurality of samples. Expressed differently, provision can be made for the calibration data not to be determined before each creation of an overview image.

In a further configuration of the method, at least two preliminary raw overview images can be recorded by the overview camera for the purposes of generating the preliminary overview image, with the first illumination differing in the preliminary raw overview images. By way of example, it is possible to use quickly switchable light sources, for example LEDs, which are used at least in two groups for the purposes of recording two raw overview images. In this way, reflections of the light sources can be suppressed or reduced by way of a suitable digital combination by calculation (for example by choosing the minimum of the individual pixel values of the respective raw overview images). It is likewise conceivable to use a reflected light illumination for one preliminary raw overview image and a transmitted light illumination for a further preliminary raw overview image.

Likewise, at least two raw overview images are recorded for the purposes of generating the overview image, with the overview illumination of the raw overview images differing. As described above, it is for example likewise possible to use quickly switching light sources and suppress or reduce reflection of the light sources by way of a suitable digital combination by calculation. Here, the overview illuminations used for the raw overview image can either be a plurality of reflected light illuminations (for example in the case of sample carriers in the form of multiwell plates) or a plurality of transmitted light illuminations (for example in the case of sample carriers in the form of slides with a coverslip). In principle, the use of a combination of transmitted light illuminations and reflected light illuminations is also conceivable.

Further, a configuration of the method is proposed, wherein at least two preliminary raw overview images are recorded by the overview camera for the purposes of generating the preliminary overview image, with the position of the sample carrier being altered by a known translation vector between the raw overview images, wherein mutually corresponding structures are recognized in the raw overview images, and wherein an approximate focus position is determined from the mutually corresponding structures in the raw overview images, the known translation vector and the calibration data. In particular, it is possible to determine the distance from the approximate focus position.

Further, it is proposed to record at least two raw overview images by the overview camera, with the position of the sample carrier being altered by a displacement vector between the raw overview images, wherein the overview image is generated as a mosaic overview image on the basis of the raw overview images and, optionally, on the basis of the displacement vector. In particular, this may be advantageous if the sample to be imaged in the overview image cannot be completely imaged using a single raw overview image of the overview camera. The combination of a plurality of raw overview images to form a mosaic overview image can also be referred to as stitching.

Further, a microscope is proposed, which comprises an overview camera, at least one microscope objective, a transmitted light unit, a reflected light unit and a control unit, wherein the control unit is set up to carry out one of the above-described methods.

Further, a computer program product is disclosed, which comprises commands which, when the program is executed by a control unit of a microscope, cause the latter to carry out one of the aforementioned methods.

Finally, a calibration plate for calibrating a microscope comprising an overview camera and a microscope objective is disclosed, wherein the calibration plate comprises at least one first calibration structure, which is able to be imaged both by the overview camera and by the microscope objective, in particular when using a calibration illumination.

The calibration plate can facilitate the automated generation of calibration data, by means of which warping and distortions of an overview camera not having a telecentric lens can be corrected. This can simplify the generation of navigable overview images.

The calibration plate can comprise at least a second calibration structure at a predefined distance from the first calibration structure. The provision of a plurality of calibration structures at fixedly defined spatial positions can further simplify the generation of corresponding calibration data.

In particular, the calibration structures can be configured such that they can be imaged by a microscope objective in the case of typical illumination configurations of the microscope and such that their relative positions can be determined. Preferably, the relative position of the calibration structures can be determined with an accuracy of better than 20 μm.

Further, the calibration structures can be configured so that they can be imaged in such a way by the overview camera in the case of typical illumination configurations that their relative position in relation to an image sensor of the overview camera can be determined with sub-pixel accuracy.

The calibration structures can have spatial intervals which have small tolerances, in particular tolerances less than 100 μm, and which are defined, stable and known in terms of their relative positions so that the calibration structures can be used to ascertain distortions and perspective correction parameters for the overview camera. As a result, when honing in on different calibration structures of the calibration plate, which can also be referred to as calibration features, these calibration structures can be brought into the image field of the microscope objective.

In particular, the calibration plate can have a chequerboard pattern, wherein the first calibration structure corresponds to a corner of a field of the chequerboard pattern. By way of example, the chequerboard pattern can comprise 20×9 fields. The corners of a field of the chequerboard pattern and/or the edges of a field of a chequerboard pattern can be determined with high precision both in images generated by the overview camera and in images generated by a microscope objective, and so the chequerboard pattern is particularly well suited to determine calibration data.

The calibration plate can be set up to reflect light diffusely. In this way, reflection effects on the surface of the calibration plate can be avoided such that the calibration structures can be imaged with at worst a small number of artefacts.

The calibration plate can be translucent. This can allow the calibration structures to be imaged even if a transmitted light illumination is used. This can further simplify the determinability of the calibration data.

Preferably, the calibration structures of the calibration plate are embodied such that they do not degrade, even in the case of an illumination with a high intensity (e.g., as a result of laser light).

The dimensioning and nature of the calibration plate can be chosen so that the calibration plate can be inserted uniquely and repeatedly into a receptacle of a stage of the microscope.

In exemplary embodiments, the calibration plate has substantially plane cover surfaces. In particular, a surface topography of the calibration plate can have height deviations of less than 100 μm. This can allow (re-)focusing for the various calibration structures of the calibration features to be simplified or be dispensed with when recording the calibration structures using a microscope objective.

The production process of the calibration plates can ensure that the relative position and the orientation of the calibration features only have very small tolerances in relation to an insertion frame of the stage of the microscope for various plates. In particular, positioning of the calibration plate in the stage can be facilitated with relative position tolerances better than ±500 μm and/or angle tolerances better than ±0.5°.

The calibration plate can have a central calibration feature which can mark a centre of a stage perforation of a stage of a microscope such that the centre of this stage perforation can be better determined for the examination of samples.

At least the first calibration structure of the calibration plate can be asymmetric such that an incorrect insertion of the calibration plate into a stage of a microscope can be detected automatically.

Further, the calibration plate can have through-holes. This can allow the application of an immersion liquid on a microscope objective of the microscope without removing the calibration plate from the stage of the microscope. Consequently, it is possible to make reference recordings using a microscope objective which is provided for the use in combination with an immersion liquid and which can also be referred to as an immersion objective, without a sample being applied.

Further calibration structures can be provided in addition to the chequerboard pattern in order to be able to determine the scaling of microscope objectives and/or in order to be able to carry out a focus comparison of a plurality of microscope objectives and/or in order to be able to determine an offset between a plurality of microscope objectives.

Attention is drawn to the fact that exemplary embodiments of the invention may be described with reference to different implementation categories. Some exemplary embodiments are in particular described with reference to a method, whereas other exemplary embodiments may be described in the context of corresponding apparatuses. Regardless of this, it is possible for a person skilled in the art to identify and to combine possible combinations of the features of the method and also possible combinations of features with the corresponding system from the description above and below, even if these belong to different claims categories.

BRIEF DESCRIPTION OF THE DRAWINGS

Exemplary embodiments are described below with reference to the following figures, in which.

DETAILED DESCRIPTION OF THE INVENTION

Figure 1:
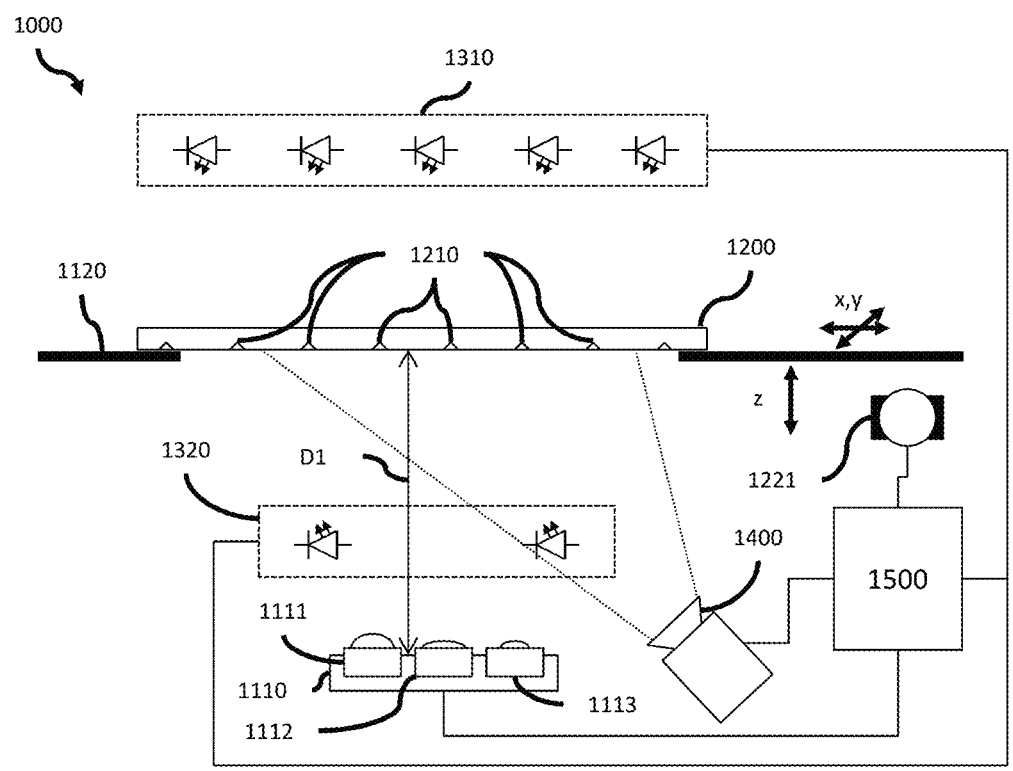
FIG. 1 schematically shows a microscope.

A microscope 1000 is illustrated in FIG. 1. The microscope comprises a plurality of microscope objectives 1111, 1112 and 1113, which are arranged in an objective turret 1110. Further, the microscope 1000 comprises a stage 1120, which is set up to receive a sample carrier or a calibration plate 1200. The stage 1120 is aligned substantially at right angles to the optical axis of the microscope objectives 1111, 1112, 1113 or of the currently used microscope objective. With the aid of translation units 1221, it is possible to alter the stage 1120 in relation to the distance from the microscope objectives 1111, 1112, 1113 or the currently used objective, i.e., in the z-direction. Typically, to this end, the objective turret 1110 is moved in relation to the stage 1120 that is stationary in the z-direction. However, as a matter of principle it would likewise be conceivable to move the stage 1120 in relation to a stationary objective turret. Furthermore, this stage 1120 can be displaced laterally in the x- and y-directions with the aid of the translation units 1221 so that a different part of the sample carrier or of the calibration plate 1200 can be brought into the object field of the currently used microscope objective.

Further, the microscope 1000 comprises a reflected light unit 1320 and a transmitted light unit 1310, which are each formed by an arrangement of light-emitting diodes. By way of example, the light-emitting diodes can be arranged in the form of a regular, planar two-dimensional array. It is likewise conceivable to arrange the light-emitting diodes on a spherical surface. Further, a non-periodic, in particular irregular arrangement of the light-emitting diodes is also possible. With the aid of the reflected light unit 1320 and the transmitted light unit 1310 it is possible to set, respectively, a bright field contrast or a dark field contrast. The individual diodes of the reflected light unit 1320 and of the transmitted light unit 1310 can also be controlled individually in exemplary embodiments.

Further, provision is made of an overview camera 1400, with the aid of which it is possible to image a larger region of the sample carrier or of the calibration plate 1200. In particular, the camera can have a non-telecentric lens. In the example shown, the overview camera 1400 is arranged to the side of the objective turret 1110. Consequently, the overview camera 1400 is directed at the sample carrier or the calibration plate 1200 in oblique fashion. Lenses with significant optical distortions are typically used in the overview camera on account of said overview camera typically being arranged at a small distance from the stage 1120 and being intended to have a large field of view (FOV) at the same time. Moreover, perspective distortions may arise on account of the oblique line of sight of the overview camera 1400 with respect to the sample carrier or the calibration plate 1200.

The microscope 1000 further comprises a control unit 1500 allowing the control of the former.

The calibration plate 1200 has calibration structures 1210, by means of which optical distortions and perspective distortions can be corrected, as will be explained below. Moreover, the calibration plate 1200 with the calibration structures 1210 allows determination of the relationship between a pixel scaling of a raw surround image recorded by the overview camera 1400 and the actual physical distance of the sample structures of a sample situated on the sample carrier.

Figure 2:
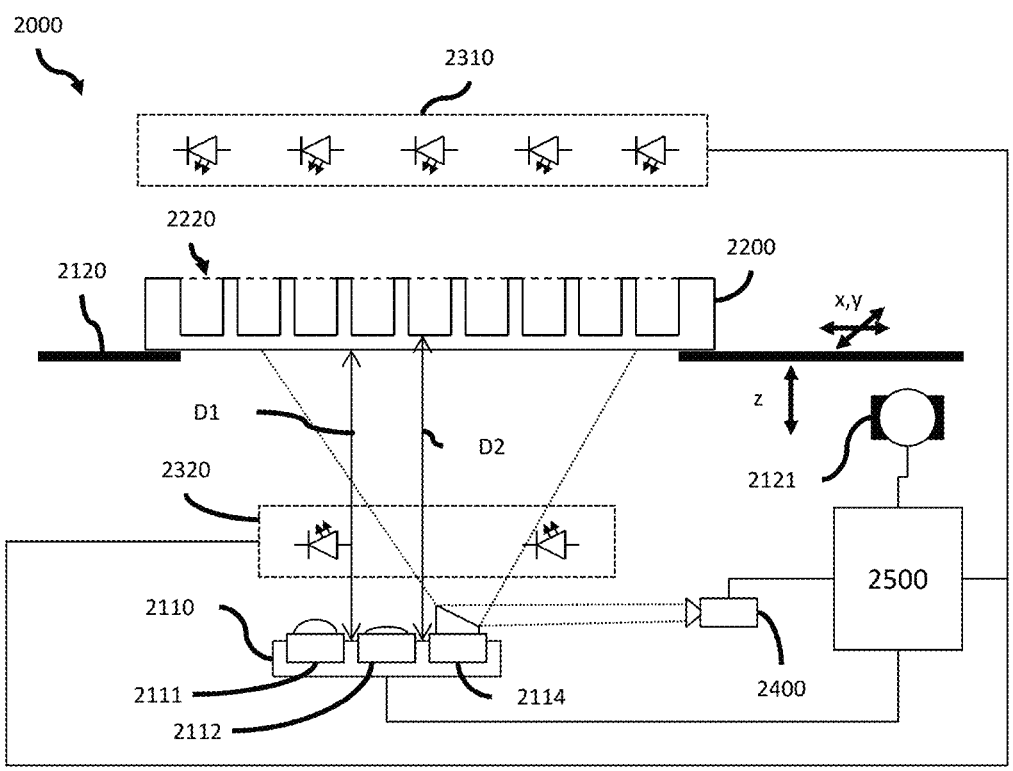
FIG. 2 schematically shows a further microscope.

FIG. 2 shows a further microscope 2000, which is similar to the microscope 1000. In this case, the elements 2111, 2112, 2110, 2120, 2121, 2310, 2320 and 2500 correspond to the above-described elements 1111, 1112, 1110, 1120, 1121, 1310, 1320 and 1500.

In contrast to the microscope 1000 shown in FIG. 1, a mirror 2114 is arranged in place of a microscope objective in the objective turret 2110 of the microscope 2000 shown in FIG. 2. The overview camera 2400 of the microscope 2000 is arranged so that a large region of the sample carrier 2200 can be observed by means of the mirror 2114. In this case, the beam path from the sample carrier 2200 to the overview camera 2400 can correspond to a substantially orthogonal alignment of the overview camera 2400 in relation to the sample carrier 2200 or the stage 2120.

In contrast to FIG. 1, it is not a calibration plate but the sample carrier 2200 that is arranged on the stage 2120. In the example shown, the sample carrier 2200 is a multiwell plate which has a plurality of wells 2220.

Figure 3:
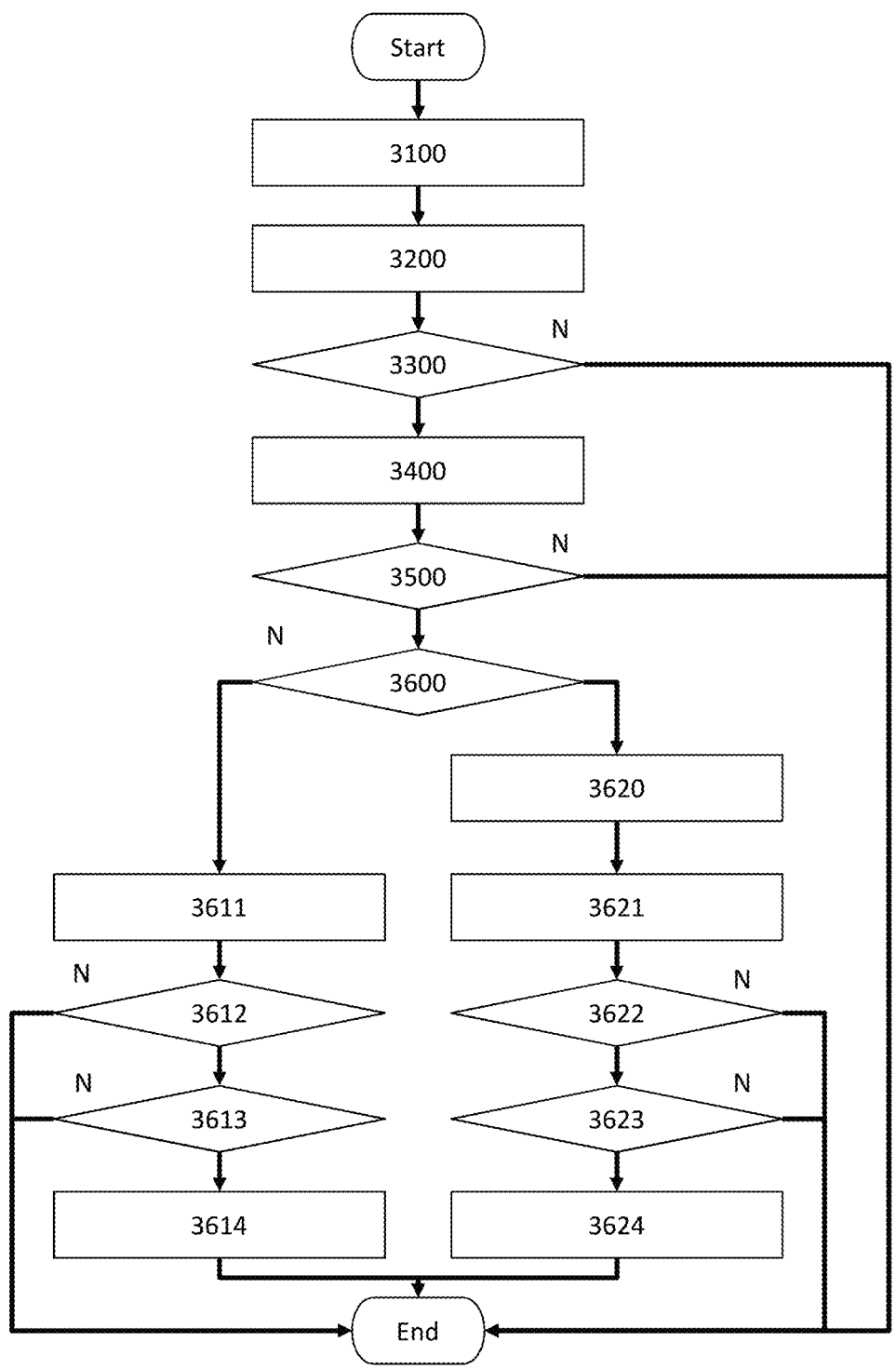
FIG. 3 shows a flowchart of a method for generating an overview image.

The method schematically described in FIG. 3 can allow the user to be provided with an overview image using a microscope as per FIG. 1 or FIG. 2, with the aid of which overview image it is possible to orient oneself in the sample. In this case, the necessary method steps can largely be carried out automatically, and so the user obtains, as easily and quickly as possible, an overview image meeting their requirements and they consequently can spend more time examining the actual sample structures of interest. In this case, the method is designed such that it works robustly with a very broad spectrum of sample carriers and samples. In particular, the method described can also permit the generation of overview images even for very large sample carriers, such as multiwell plates with dimensions of 128×86 mm, for example.

Initially, a calibration is carried out in a step 3100, for example with the aid of the calibration plate; this can be used to reduce distortions and warping of the raw overview images recorded by the overview camera, facilitate an assignment of the object fields of the microscope objectives in relation to the overview image and, ultimately, also facilitate a determination of the physical dimensions of the sample. Step 3100 can be optional. In particular, it is conceivable not to carry out step 3100 ahead of every creation of an overview image.

Further, the overview illumination optimized for the presentation of the overview image is determined in step 3200. The overview illumination can be a reflected light illumination or a dark field illumination. Here, an overview image illumination can be proposed to the user on the basis of the recognized sample carrier type, with the user having to confirm said illumination, or the determined overview illumination can be adopted automatically. Step 3200 preferably also comprises the recognition of the sample carrier type.

If the sample carrier type is identified or no optimized overview image illumination can be proposed to the user, the method can be terminated (step 3300).

Once a sample carrier type has been identified, there can be honing in on the focus 3400.

If an approximate focus position is found (step 3500), a decision is made in a next step 3600 as to whether the FOV (field of view) of the overview camera is sufficient to present the entire sample in the overview image. On the one hand, this can be implemented manually; on the other hand, however, it is also conceivable that the control unit already recognizes that use is made of a sample carrier type which is greater than the FOV of the overview camera.

In the case of a sufficient FOV, recognizing the sample carrier is implemented in a next step (step 3611). Using the optimized overview image illumination (e.g., transmitted light illumination with dark field contrast in the case of a slide with coverslip or a transmitted light illumination in the case of a multiwell plate) can improve the recognition of the sample carrier and its structures.

Once the sample carrier has been identified in step 3612, a check is carried out in step 3613 as to whether the sample should be recognized automatically in the overview image.

The sample is recognized automatically should this be the case.

If the FOV of the overview camera was established in step 3600 as insufficient to image the entire sample, a plurality of raw overview images are generated in step 3620 by virtue of the stage of the microscope always being displaced a bit to the side. The individual raw overview images can also be referred to as tiles. The individual tiles can subsequently be put together to form a mosaic (stitching). In this case, the mosaic image can be formed on the basis of known travels of the translation units such that errors can be avoided which may occur during stitching on the basis of corresponding structures of the individual raw overview images.

In step 3621, a detection of the sample holder is subsequently carried out in step 3621. The sample holder can serve to securely hold the sample carrier on the stage of the microscope. Detecting the sample holder can assist with avoiding collisions between microscope objectives and the sample holder if the distance of the sample carrier from the microscope objectives is changed or the stage of the microscope is displaced to the side.

If prior detection of the sample carrier has been determined in step 3622, there can be a query in a further step 3623 as to whether the sample should also be automatically recognized in the overview image.

If this is the case, an automatic detection of the sample in the overview image is carried out in step 3624.

Figure 4:
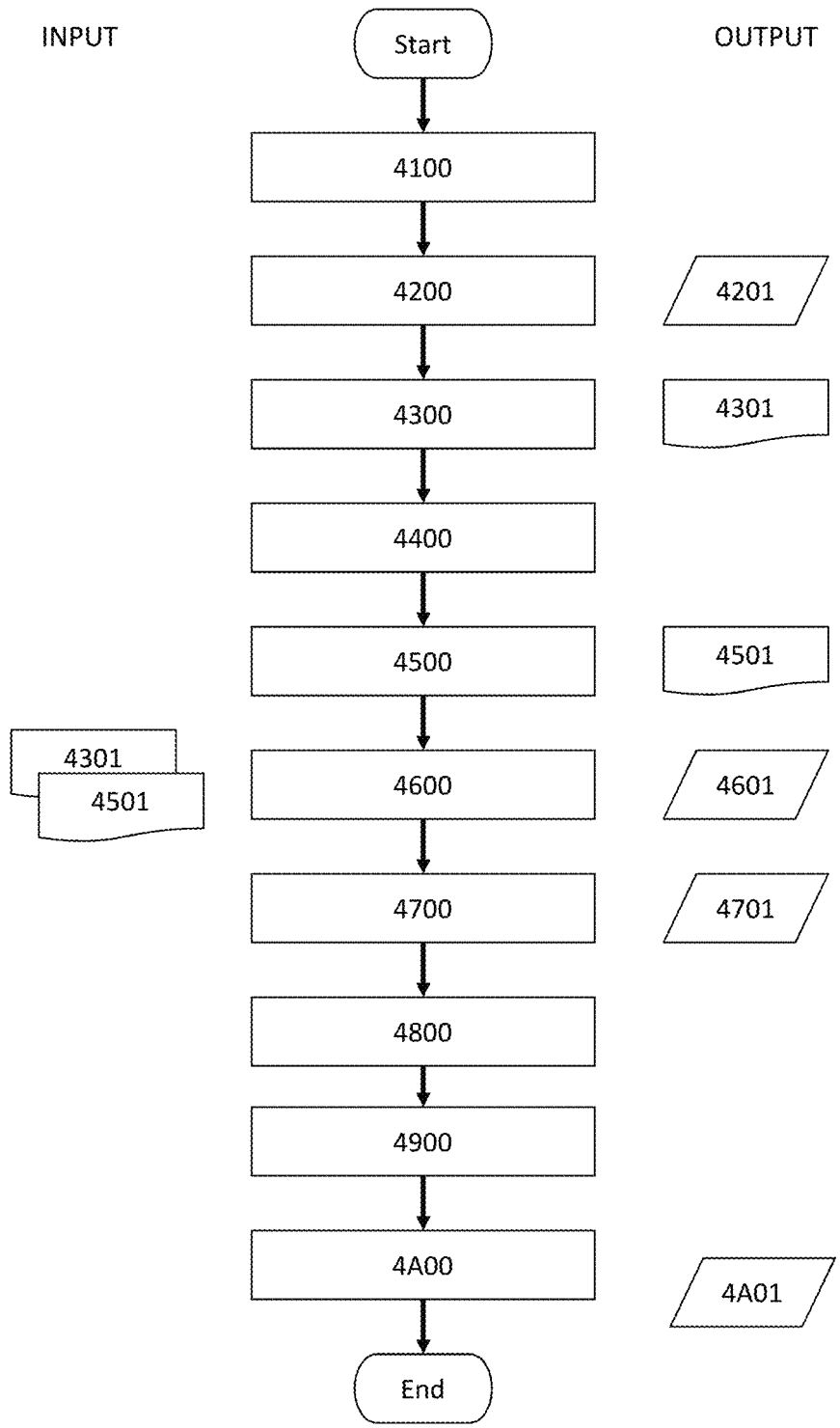
FIG. 4 shows a detail of the flowchart according to FIG. 3.

Step 3100 of FIG. 3 is explained in more detail in FIG. 4. Initially, a calibration plate is fastened to the stage of a microscope in defined fashion in step 4100.

Subsequently, the distance of the overview camera and of the objective turret from the stage of the microscope is adjusted such that calibration structures of the calibration plate can be imaged in focus with the aid of the overview camera. This position may also be referred to as reference focus position 4201.

In step 4300, a calibration overview image 4301 is created by the overview camera using a suitable calibration illumination, e.g., a reflected light illumination. In step 4400, the stage of the microscope can be displaced laterally and a displaced calibration overview image 4501 can be obtained in step 4500.

Calibration data 4601 are obtained in a further step 4600 from the calibration overview image 4301 and the displaced calibration overview image 4501. By way of example, this can be facilitated by triangulation. The calibration data can be used to correct distortions of an objective of the overview camera and/or perspective distortions on account of a non-perpendicular alignment of the overview camera with respect to the sample stage.

A first detailed image 4701 of a calibration structure of the calibration plate can be recorded by means of a microscope objective in a step 4700.

Subsequently, the calibration plate can be displaced laterally in step 4800, in such a way that a second detailed image 4902 of at least one second calibration structure of the calibration plate can be recorded using the microscope objective in step 4900. Typically, further detailed images 4902 of further calibration structures of the calibration plate are recorded in step 4900. Overall, four calibration structures, for example, may be recorded. Subsequently, calibration data 4A01 for locating detailed images in the overview image can be obtained in step 4A00.

Figure 5:
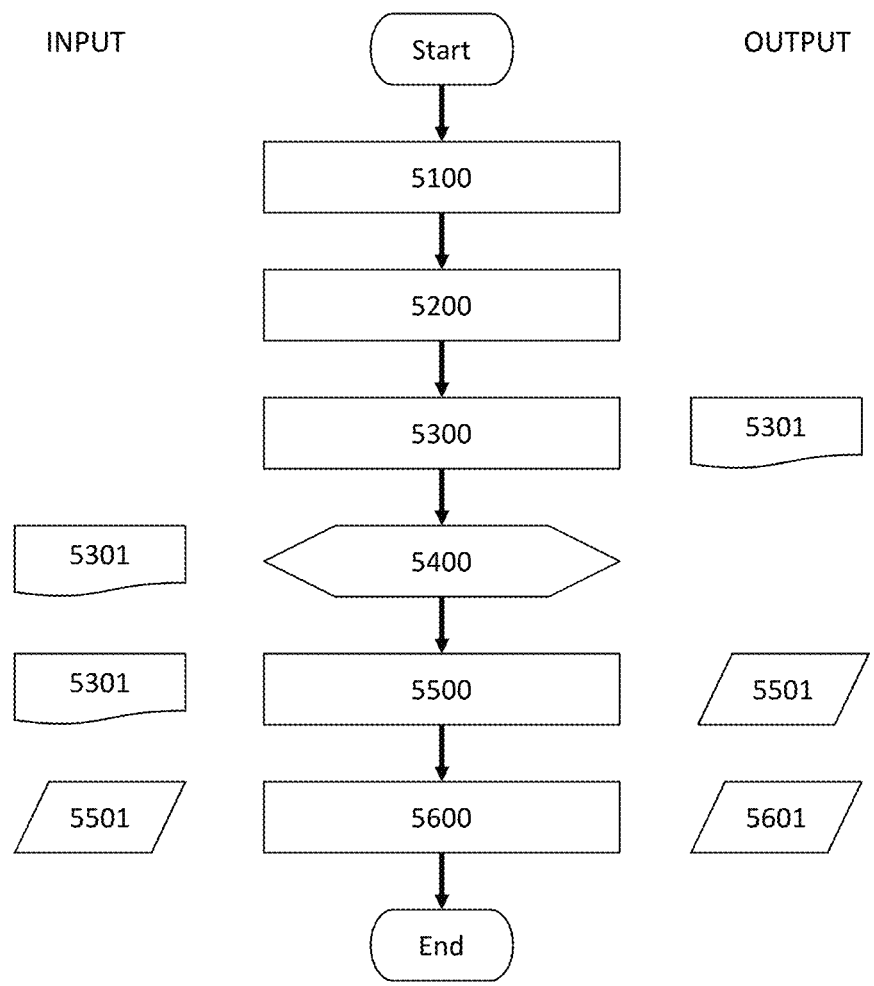
FIG. 5 shows a detail of the flowchart according to FIG. 3.

Step 3400 of FIG. 3 is explained in more detail in FIG. 5. The focal point of the overview camera is brought into a reference position in a first step 5100. This can be implemented by virtue of the stage of the microscope being brought closer or further away from the overview camera. The stage of the microscope is brought into a central position in step 5200. Subsequently, a preliminary raw overview image is recorded in step 5300 and corrected in view of distortion and warping on the basis of the calibration data obtained in step 3100 such that a preliminary overview image 5301 is obtained. Like in step 5400, this preliminary overview image 5301 can be displayed to the user of the microscope. This can allow the user to check, in a first step, the correct functionality of the proposed method. Furthermore, a sample carrier type 5501, which is situated in the observation volume of the microscope, can be identified in a step 5500 on the basis of the preliminary overview image 5301. To this end, use can be made for example of an ML (machine learning) system, which has been trained using a multiplicity of sample carrier images. To recognize or classify the sample carrier type 5501, use can be made of a convolutional neural network (CNN), for example, as described in more detail in the articles Krizhevsky, Sutskever, Hinton: "ImageNet Classification with Deep Convolutional Neural Networks" (NIPS 2012) and He, Zhang, Ren, Sun: "Deep residual learning for image recognition" (CVPR 2016).

On the basis of the determined sample carrier type 5501, the overview image illumination 5601 intended to be used for the creation of the overview image can be chosen in step 5600. In this case, the overview image illumination 5601 can be chosen automatically. Alternatively, it is conceivable that the overview image illumination is proposed to the user of the microscope on the basis of the determined sample carrier type 5501 and said user must only confirm the selection, although they could still select a different type of overview illumination.

Figure 6:
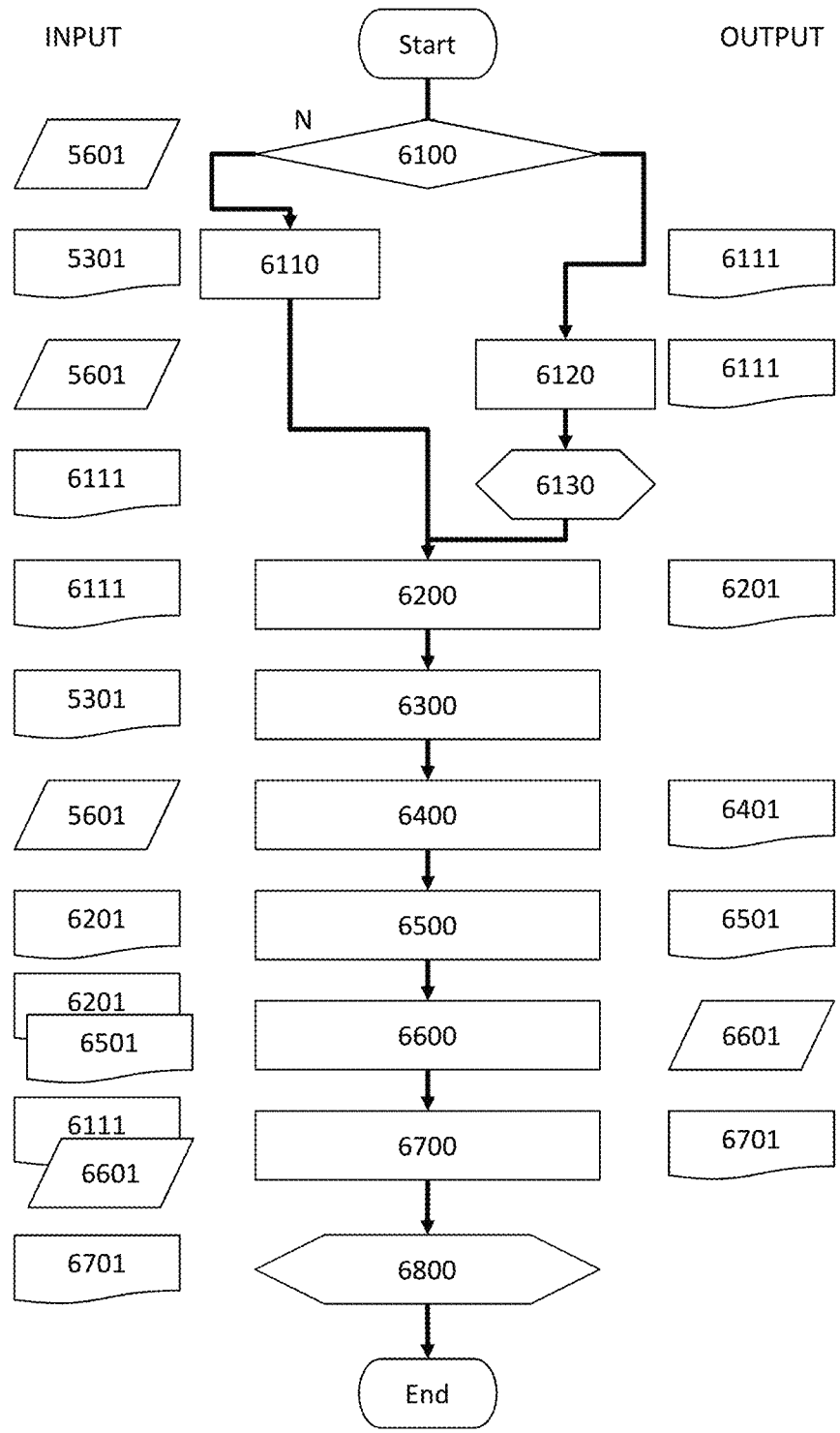
FIG. 6 shows a detail of a flowchart according to FIG. 3.

By way of example, step 3400 of the method illustrated in FIG. 3 can be carried out as illustrated in FIG. 6. A check is carried out in a first step 6100 as to whether the overview image illumination 5601 differs from the reflected light illumination used to record the preliminary overview image 5301. Provided this is not the case, the preliminary overview image 5301 continues to be used as preliminary overview image 6111 (step 6110).

If the overview image illumination 5601 differs from the reflected light illumination, a new preliminary overview image 6111 is recorded in step 6120 using the overview image illumination 5601. The new preliminary overview image 6111 can in turn be displayed to the user of the microscope (6130).

A segmentation is carried out on the basis of the preliminary overview image (6200) and a mask image 6201 is obtained. In particular, the mask image 6201 can visualize structures of the sample carrier. By way of example, the segmentation can be carried out on the basis of fully convolutional networks (FCN), as described, for example, in the articles Chen, Zhu, Papandreou, Schroff, Adam: "Encoder-decoder with atrous separable convolution for semantic image segmentation. (ECCV 2018) and Shelhamer, Long, Darrell: "Fully convolutional networks for semantic segmentation" (PAMI 2016). In particular, the segmentation can be carried out on the basis of a pixel-related classification.

Subsequently, the stage of the microscope is displaced to the side in step 6300. Using the overview image illumination 5601, a further preliminary overview raw image is recorded in step 6400 and, following the correction of distortion and warping, a displaced preliminary overview image 6401 is obtained. Another segmentation can be carried out in step 6500 on the basis of the displaced preliminary overview image 6401 so that a displaced mask image 6501 can be obtained.

An approximate focus position can be determined in step 6600 on the basis of the mask image 6201 and the displaced mask image 6501.

Determining the approximate focus position 6601 can take account of the fact that the distance D1 between the objective turret or the overview camera and the calibration plate may differ from the distance D2 between the object revolver or the overview camera and the sample carrier. In particular, in the case of a sample carrier in the form of a multiwell plate, the focal position should be located at the base of the wells and not on the lower side of the sample carrier.

Further details of the method for determining the approximate focus position can be gathered from the document DE 10 2018 133 188 A1.

A corrected preliminary overview image 6701 can be obtained in step 6700 on the basis of the preliminary overview image 6111 and the approximate focus position 6601. Subsequently, the corrected preliminary overview image 6701 can be displayed to the user of the microscope again (step 6800).

Figure 7:
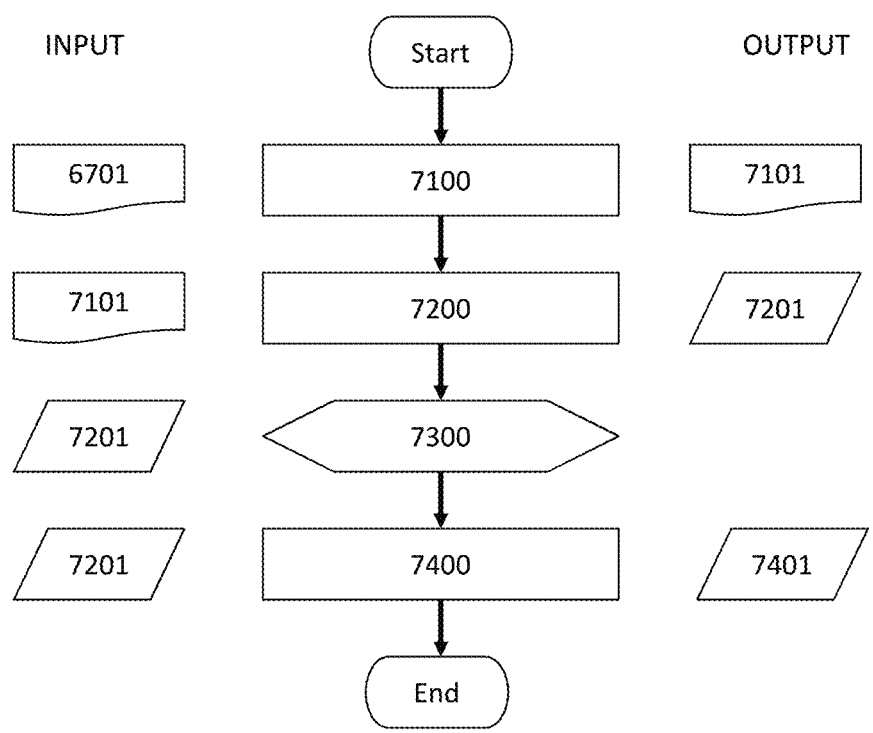
FIG. 7 shows a detail of the flowchart according to FIG. 3.

Method step 3611 of FIG. 3 is explained in more detail in FIG. 7. A sample carrier mask image 7101 is generated in step 7100 on the basis of the preliminary overview image 6701. The sample carrier mask image 7101 is used in step 7200 for identifying the various regions of the sample carrier. The sample carrier information 7201 obtained can be displayed to the user of the microscope in step 7300. By way of example, the various wells of a multiwell plate can be displayed to the user of the microscope. Based on the step 7400, a sample carrier template 7401 can be generated on the basis of the sample carrier information 7201. By way of example, the sample carrier template 7401 can represent different wells of a multiwell plate in simplified fashion, and so it is possible to individually hone in on these wells. The various wells of the multiwell plate may be numbered in lines and/or columns.

Figure 8:
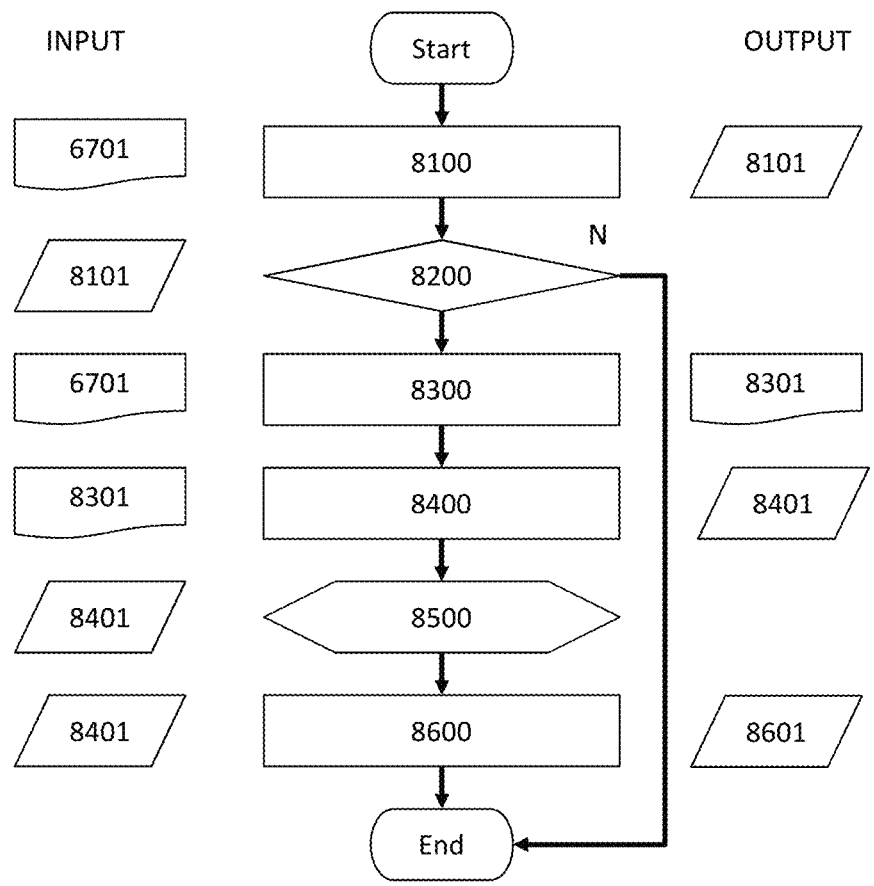
FIG. 8 shows a detail of the flowchart according to FIG. 3.

FIG. 8 shows details of method step 3614 of FIG. 3 in exemplary fashion. In a first step 8100, the quality of the recording of the sample region is examined on the basis of the overview image 6701. On the basis of the information relating to the sample region recording quality 8101, a decision is made in step 8200 as to whether a segmentation 8300 of the sample region can be carried out. Initially, a mask 8301 is generated on the basis of the overview image 6701 when segmenting the sample regions. In step 8400, the mask 8301 is used to identify the sample regions 8401. In particular, the mask 8301 can serve to define regions which may contain a sample. By way of example, samples that should be examined are typically only arranged in the region of the coverslip in the case of slides and only within the wells in the case of multiwell plates. The identified sample regions 8401 are shown to the user of the microscope in step 8500. Consequently, the latter can check whether the correct regions have been identified with the aid of the automated method. On the basis of the sample regions 8401, the sample region can be divided in step 8600 into smaller tile regions, which can be analysed individually with the aid of a microscope objective.

Figure 9:
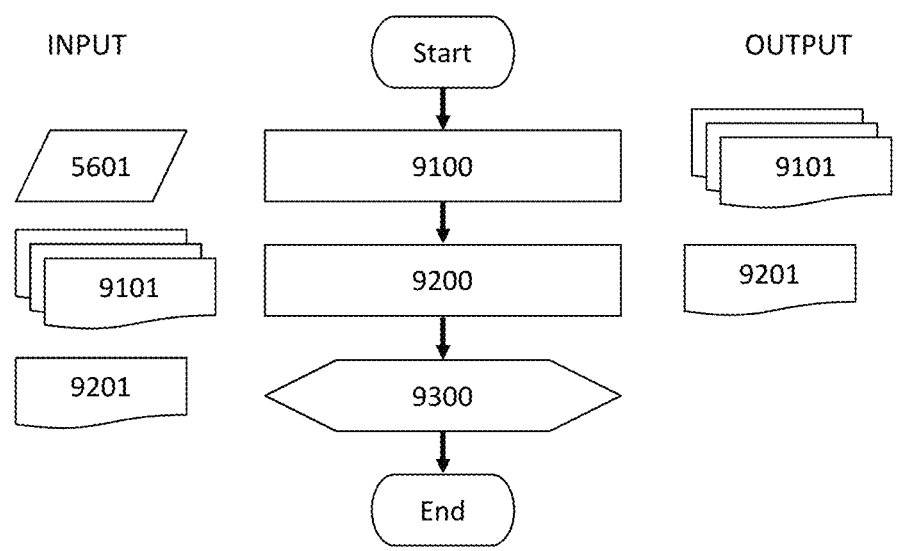
FIG. 9 shows a detail of the flowchart according to FIG. 3.

FIG. 9 shows details of method step 3620 of FIG. 3. On the basis of the overview image illumination 5601, a plurality of raw overview images are recorded in method step 9100 using displacements of the stage of the microscope such that, following the correction of distortions and warping, a plurality of tile overview images 9101 are obtained. In step 9200, the various tile overview images 9101 are combined to form an overview image 9201, wherein the combined overview tile image 9201 can also be referred to as mosaic overview image. The mosaic overview image 9201 is then displayed to the user of the microscope in step 9300.

Figure 10:
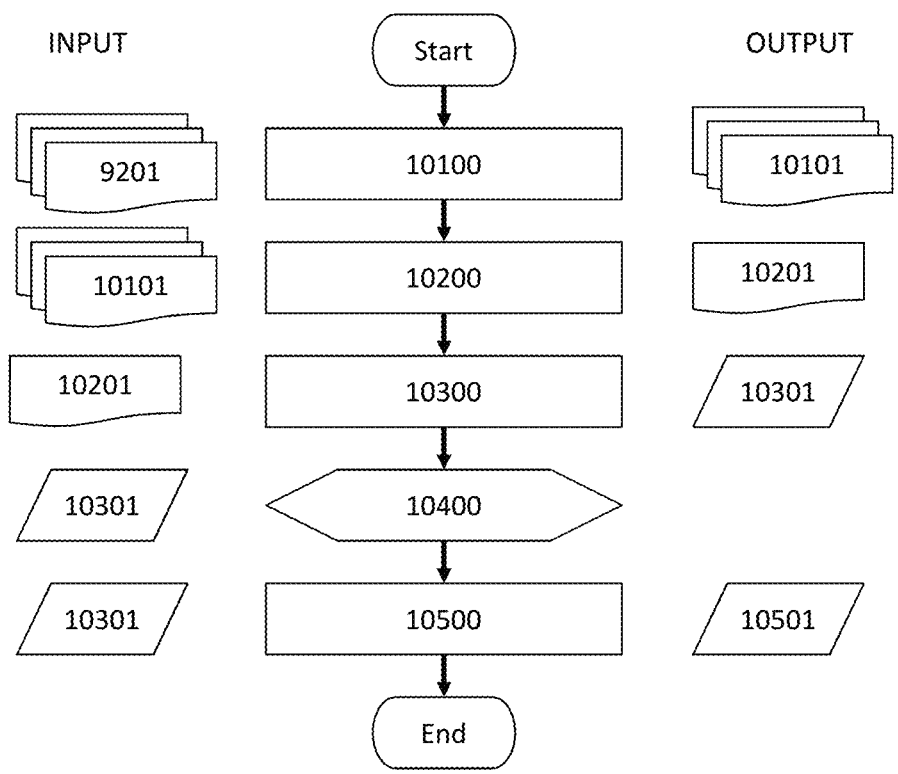
FIG. 10 shows a detail of the flowchart according to FIG. 3.

Step 3621 of FIG. 3 is illustrated in greater detail in FIG. 10. A multiplicity of tile mask overview images 10101 are generated in a first step 10100 on the basis of the tile overview images 9201. The tile mask overview images are combined to form a mosaic mask image 10201 in step 10200. By way of example, this can be implemented with the aid of stitching. The sample regions 10301 are identified in step 10300 on the basis of the mosaic mask overview image 10201. The sample regions are displayed to the user of the microscope in step 10400. In step 10500, the sample regions 10301 are analysed and a sample carrier template 10501 is created.

Figure 11:
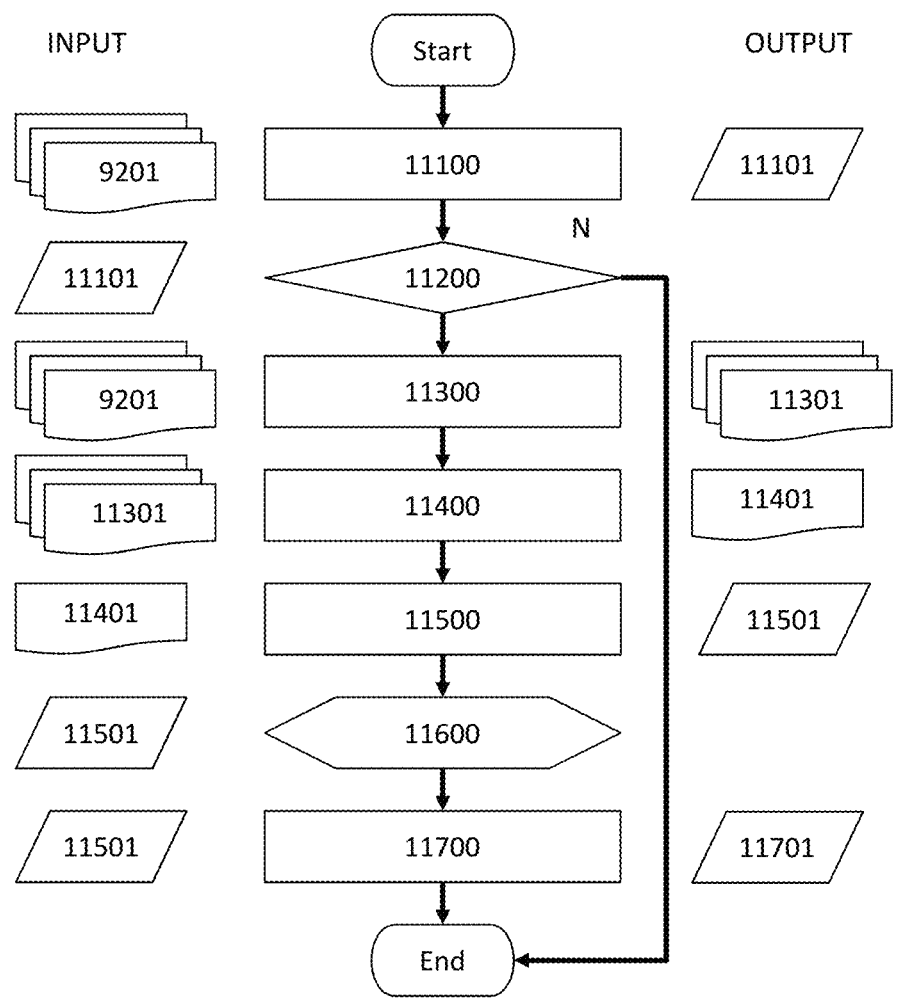
FIG. 11 shows a detail of the flowchart according to FIG. 3.

Step 3624 of FIG. 3 is explained in more detail in FIG. 11. The quality of the tile overview images 9201 is determined in a first step 11100. Whether the method is continued is defined in step 11200 on the basis of the determined quality 11101. In step 11300, a segmentation of the sample region is carried out on the basis of the tile overview images and tile mask overview images 11301 are obtained. The tile mask overview images 11301 are put together to form a mosaic overview image 11401 in step 11400.

In step 11500, the mosaic overview image 11401 is used to extract the sample regions 11501. The extracted sample regions 11501 are subsequently shown to the user of the microscope in step 11600. In step 11700, the sample regions 11501 are divided into tile sample regions 11701, which can be examined in more detail on an individual basis using a microscope objective.

Figure 12:
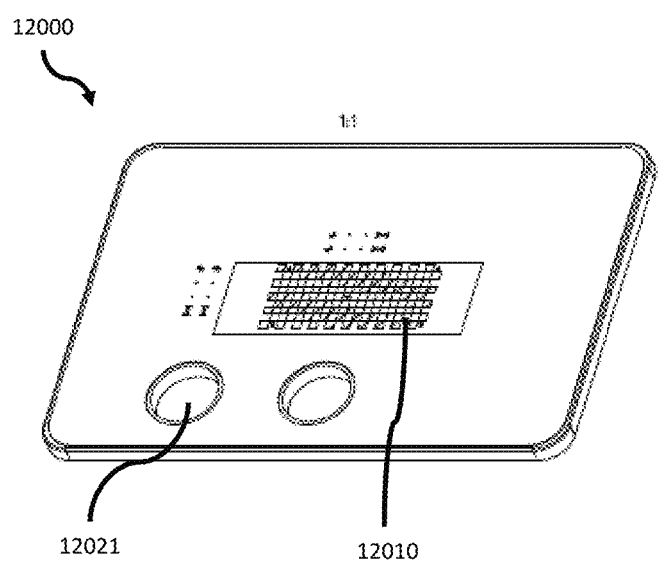
FIG. 12 shows a calibration plate.

FIG. 12 shows an exemplary embodiment of a calibration plate 12000, which can be used in any one of the above-described methods. The calibration plate 12000 has at least one through-hole 12021, which can allow an immersion liquid to be applied to an immersion objective of the microscope. Further, the calibration plate 12000 has a chequerboard pattern 12010 comprising a plurality of calibration structures. The calibration plate 1200 can be translucent, in particular transparent, such that the chequerboard pattern 12010 or a part of the chequerboard pattern 12010 can be recorded by the overview camera and/or a microscope objective both when using a reflected light illumination and when using a transmitted light illumination.

Figure 13:
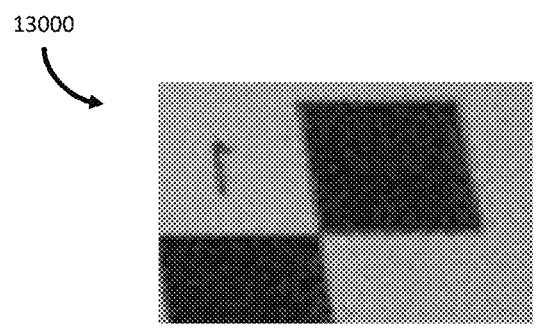
FIG. 13 shows a section of a raw overview image of the calibration plate.
Figure 14:
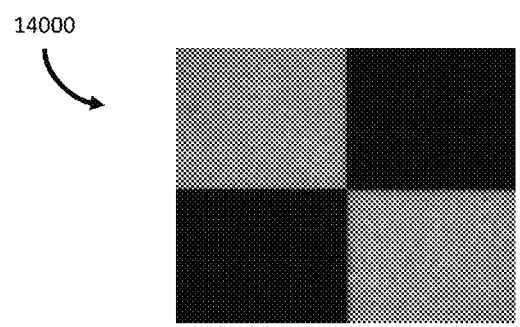
FIG. 14 shows a detailed image of the calibration plate.

FIG. 13 shows a section 13001 of a raw overview image of a first calibration structure of the calibration plate 12000, as recorded by an overview camera of a microscope. FIG. 14 shows a detailed image 14001 of the same calibration structure, as recorded using a microscope objective of the microscope. The utilized microscope objective was a 5× microscope objective with a significantly smaller image field than the overview camera. FIGS. 13 and 14 show that the same calibration structure of the calibration plate can be imaged well in both cases and the edges of the fields of the chequerboard pattern 12010 are imaged in focus such that the generation of calibration data for correcting distortions and/or perspective warping can be carried out in automated fashion.

Figure 15:
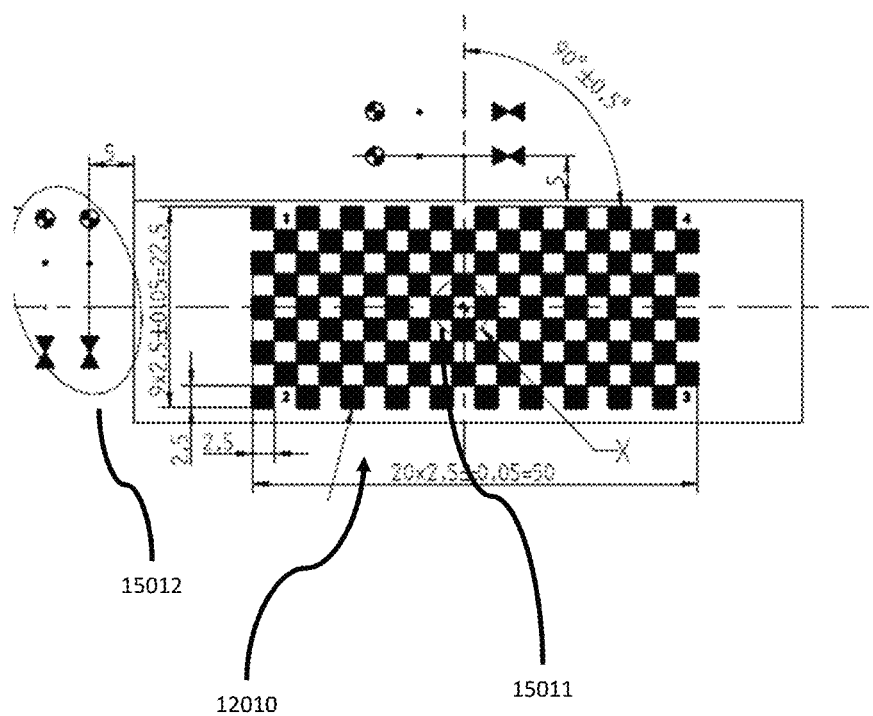
FIG. 15 shows calibration structures in the calibration plate.

As indicated in FIG. 15, the calibration plate 12000 may comprise further calibration structures 12011, 12012 in addition to the chequerboard pattern 12010. By way of example, provision may be made of a calibration structure 12011 which can be used to optically determine the centre of a stage of the microscope. Furthermore, calibration structures 12012 can allow a scaling of objectives to be undertaken. The calibration structures 12012 can also serve to carry out focus balancing between a plurality of microscope objectives and/or to determine an offset between a plurality of microscope objectives.

In summary, the described method, the proposed microscope and the disclosed calibration plate facilitate the automated, fast creation of a navigable overview image. Consequently, a user of the microscope can quickly navigate to points of samples to be examined on the basis of the overview image or proceeding from known positions of the sample on the sample carrier, and can further analyse said points using the microscope objectives with a great magnification. Consequently, the user can use their available time optimally, and so they can quickly obtain results.

Within the scope of the method described, different ML systems, which have been trained with annotated images of various sample carriers and samples and possibly with annotated data, can be used for recognizing the sample carrier type, recognizing cover slips of slides, for segmenting multiwell plates, determining the classification quality and the sample region segmentation. In particular, edges and textures in the images can be recognized in the process. Object parts can be recognized numerically and different objects can be recognized.

What is claimed is:

1. A method for generating an overview image of a sample which is arranged in an observation volume of a microscope by means of a sample carrier,
    wherein the sample carrier is illuminated by a first illumination,
    wherein a preliminary overview image is generated using the first illumination and an overview camera of the microscope,
    wherein an overview image illumination is automatically chosen on the basis of the preliminary overview image,
    wherein the sample carrier is illuminated by the overview illumination, and
    wherein the overview image is generated using the overview image illumination and the overview camera.

2. The method according to claim 1, wherein the overview image illumination comprises a reflected light illumination and/or a transmitted light illumination.

3. The method according to claim 1,
    wherein the preliminary overview image is processed in a trained machine learning-based system, ML system,
    wherein the overview image illumination is chosen on the basis of an output of the ML system.

4. The method according to claim 3,
    wherein the output of the trained ML system comprises a statement about the sample carrier type of the sample carrier and
    wherein the overview image illumination is determined on the basis of the sample carrier type.

5. The method according to any one of preceding claim 1,
    wherein a calibration plate is arranged in the observation volume,
    wherein the calibration plate is illuminated using a calibration illumination,
    wherein calibration overview images are generated using the calibration illumination and the overview camera,
    wherein calibration data are obtained by means of the calibration overview images, and wherein the preliminary overview image and/or the overview image are generated using the calibration data.

6. The method according to claim 5,
wherein the calibration plate comprises a first calibration structure,
wherein the calibration overview image comprises an image representation of the first calibration structure,
wherein a first detailed image of the first calibration structure is generated using a microscope objective of the microscope, and
wherein further calibration data for locating a sample detail image of the sample in the overview image are obtained on the basis of the calibration overview images and the first detailed image.

7. The method according to claim 6,
wherein the calibration plate comprises at least one further calibration structure,
wherein, following the generation of the first detailed image, the position of the calibration plate in relation to the microscope objective is altered by at least one further predefined translation vector, wherein at least one second detailed image of the further calibration structures/calibration structure is generated using the microscope objective of the microscope, and
wherein the calibration data are obtained by additional use of the further predefined translation vectors and the evaluation of the positions of the calibration structures in the further detailed images.

8. The method according to claim 6, wherein the sample detail image is generated using the microscope objective or a further microscope objective.

9. The method according to claim 1, wherein at least two preliminary raw overview images are recorded by the overview camera for the purposes of generating the preliminary overview image, with the first illumination differing in the preliminary raw overview images.

10. The method according to claim 1, wherein at least two raw overview images are recorded for the purposes of generating the overview image, with the overview image illumination of the raw overview images differing.

11. The method according to claim 1,
wherein at least two preliminary raw overview images are recorded by the overview camera for the purposes of generating the preliminary overview image, with the position of the sample carrier being altered by a known translation vector between the raw overview images,
wherein mutually corresponding structures are recognized in the preliminary raw overview images, and wherein an approximate focus position is determined from the mutually corresponding structures in the preliminary raw overview images, the known translation vector and the calibration data.

12. The method according to claim 1, wherein at least two raw overview images are recorded by the overview camera, with the position of the sample carrier being altered by a displacement vector between the raw overview images, and wherein the overview image is generated as a mosaic overview image on the basis of the raw overview images and, optionally, on the basis of the displacement vector.

13. A microscope,
comprising an overview camera,
comprising at least one microscope objective,
comprising a transmitted light unit,
comprising a reflected light unit,
comprising a control unit,
wherein the control unit is set up to carry out a method according to claim 1.

14. A non-transitory computer-readable medium comprising computer-executable instructions that, upon execution of the program by a control unit of a microscope, cause the latter to carry out a method according to claim 1.

15. The method according to claim 1, further comprising automatically recognizing the sample in the overview image.

16. The method according to claim 1, further comprising performing segmentation of the overview image to generate a mask image that visualizes structures of the sample carrier.

17. The method according to claim 1, further comprising performing segmentation of the overview image to identify one or more sample regions that contain the sample.

* * * * *